July 12, 1949.　　　　　J. G. MEJEAN　　　　　2,476,106
ELECTRIC MOTOR FOLLOW-UP TRANSMITTING APPARATUS
Filed March 27, 1946　　　　　　　　　　3 Sheets-Sheet 1

INVENTOR
JACQUES G. MEJEAN
BY Benj. T. Rauber
ATTORNEY

July 12, 1949. J. G. MEJEAN 2,476,106
ELECTRIC MOTOR FOLLOW-UP TRANSMITTING APPARATUS
Filed March 27, 1946 3 Sheets-Sheet 2

INVENTOR
JACQUES G. MEJEAN
BY Benj. T. Rauber
ATTORNEY

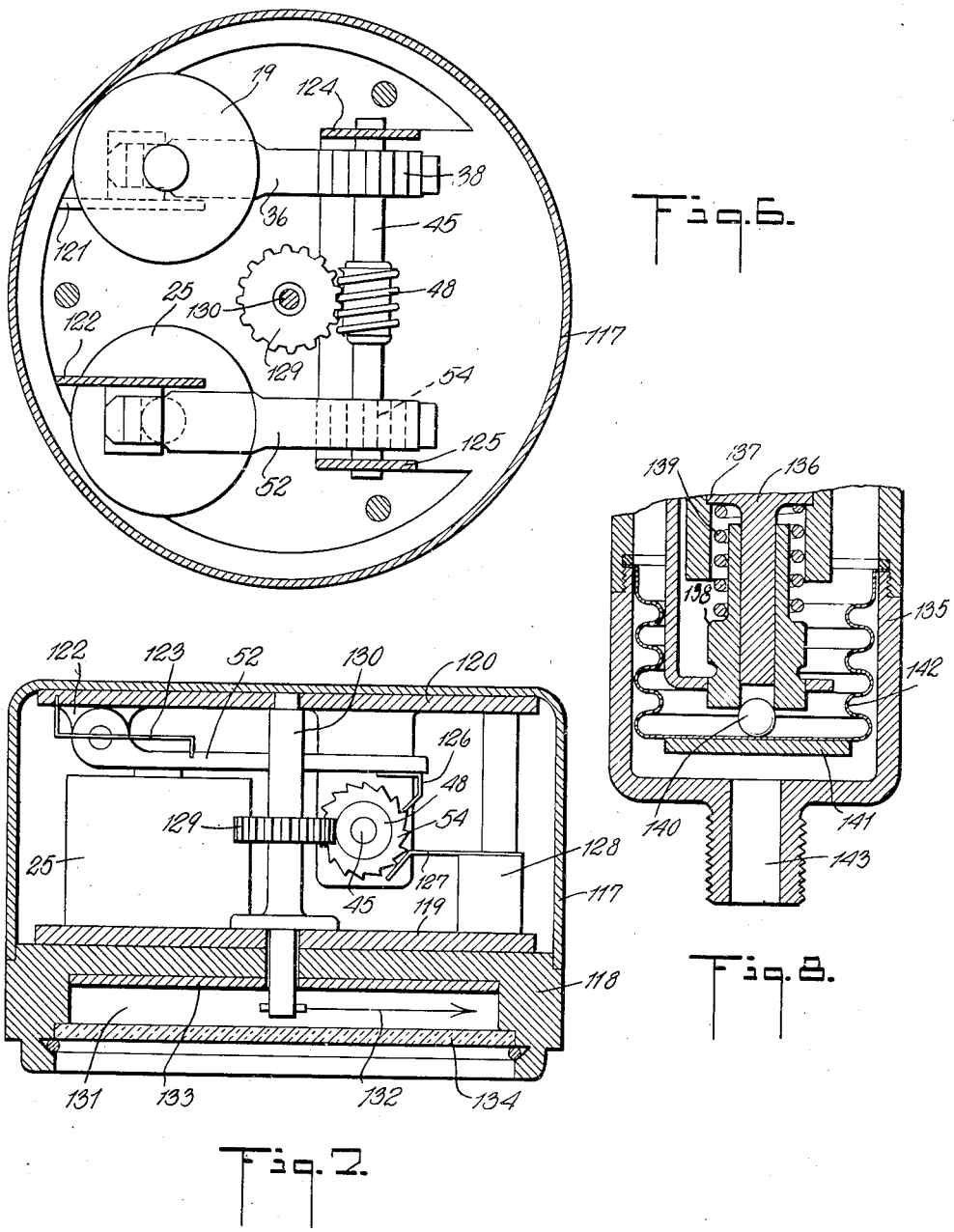

Patented July 12, 1949

2,476,106

UNITED STATES PATENT OFFICE 2,476,106

ELECTRIC MOTOR FOLLOW-UP TRANSMITTING APPARATUS

Jacques G. Mejean, Greenwich, Conn., assignor, by mesne assignments, to The Aerotec Corporation, Greenwich, Conn., a corporation of Connecticut Application March 27, 1946, Serial No. 657,579

16 Claims. (Cl. 318—21)

My present invention relates to an electric transmitting apparatus for measuring and transmitting displacements, pressures, temperatures, liquid levels, speeds and other measurements, and for electric distance control.

In my invention a displacement of an element such as a pressure indicator or a speed indicator, etc., is transmitted in such a way as to cause an equal or proportionate displacement of an indicating or control element at a distance.

In the apparatus of my invention an actuating element thus displaced at the sending station serves to move a control switch at the sending station to connect one or the other of a pair of branched circuits to a source of electric energy such as a battery or electric generator.

Each branch of the circuit comprises a pair of electrically actuated reciprocating elements as for example a pair of solenoids and a core or armature actuated thereby. One such solenoid or actuating element of each circuit is positioned near a sending station switch that may connect the branch circuits alternately with the source of electricity. The other of each of the solenoids or electrically actuated elements is located at a distance to which the displacements are to be transmitted.

Between these latter solenoids or actuating means and the opposite pole of the source of electric energy is a vibrating or make and break switch which connects the branch circuits alternately in successive cycles with the source of electric energy. Accordingly this vibrating switch periodically connects the branch circuits alternatively with the source of electric energy.

When a displacing element such as a temperature, pressure or level indicator at the sending station is displaced it swings the sending station switch to connect one of the branch circuits to the source of electric energy. Inasmuch as this circuit is intermittently connected to the source of energy a pulsating or intermittent current passes through the corresponding solenoid or electrically actuated mechanism. This mechanism acts as a ratchet on a switch actuating mechanism to return the switch at the sending station to its original position; at the same time equal pulsations or interruptions of current in the same circuit act on the corresponding solenoid or actuating element at the distant station to rotate or move in a similar manner an indicating element.

The distant actuated element may be calibrated in terms of the sending station movement, or it may be used to control or actuate any suitable control mechanism. Its movements will accordingly be the same as, or in exact proportion to, those of the sending element and its time of movement will be substantially identical with that of the sending element.

A displacement of the sending element in the opposite direction will similarly connect the other branch circuit causing a movement in the reverse direction of both the switch operating element and the distant actuated element until the neutral position of the switch is restored.

Means may also be provided to open the circuit from the source of electric energy when the sending switch is in mid position and thereby avoid unnecessary use of electric current.

The switch at the sending station comprises a pair of terminal plates in fixed relation to each other and slightly spaced or insulated from each other. It also comprises a contact roller which in mid position spans the distance between the insulated contact plates connecting both branch circuits to the source of electric energy, or when displaced relative to the contact plates, will connect one or the other alternatively depending upon the direction in which it is moved.

It will be understood that a relative movement is all that is required so that either the plates or the roller may be directly actuated by the indicator mechanism. The spacing of the plates may be very small and a very slight movement relative to the roller will cause the actuation of the corresponding branch circuit until the roller is in mid position and a corresponding indication will be made at the distant station.

The various features of the invention are illustrated by way of example in the accompanying drawings in which Fig. 1 is a diagrammatic sketch of the apparatus showing the electric circuits and the principle of operation;

Fig. 6 is a plan view of the receiving mechanism;

Fig. 7 is a vertical section of the receiving mechanism;

Fig. 8 is a sectional view of the apparatus for transforming the movements of the receiving apparatus into pressure changes.

Figure 1:
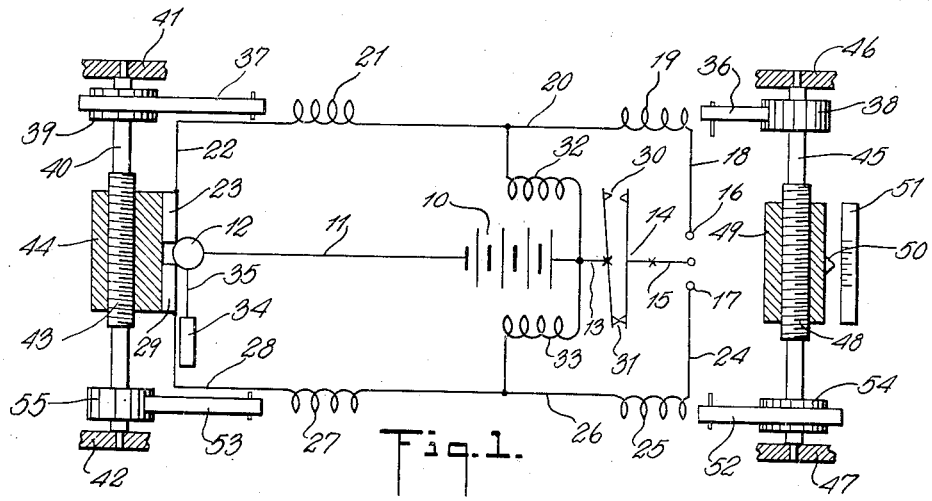

Referring more particularly to Fig. 1 of the accompanying drawings, a source 10 of electric energy is connected at one pole to a conductor 11 leading to a roller 12 of the sending or transmitting control switch. The opposite pole of the battery or other source of electric energy is connected through a conductor 13 and a relay switch 14 to a vibrating or make and break switch 15 which is swung or otherwise moved first in one direction to a terminal 16 of one branch circuit and then to a terminal 17 of a parallel branch circuit.

When the switch 15 is in contact with the terminal 16 current passes from the source of electricity through a conductor 18, thence through a solenoid 19 and a branch circuit conductor 20 to and through a second solenoid 21 from which it passes through a conductor 22 to a terminal 23.

Similarly when the switch 15 is in contact with the terminal 17 current passes through a conductor 24, solenoid 25, branch circuit conductor 26, solenoid 27 and conductor 28 to a second contact plate 29 closely spaced from and insulated from the plate 23.

It will be understood that the solenoids 21 and 27 are at the sending station and that the solenoids 19 and 25 are at the distant station. It will also be understood that the conductors 18, 20, 24 and 26 may be a conductor wire as illustrated in the drawings, or may be in part a wireless or radio transmitter system of any suitable type. The latter is not illustrated as it is standard construction and in no way changes the operation of the apparatus.

When the roller 12 is in mid position as indicated in Fig. 1 it is in contact with both of the plates 23 and 29. If the wires 13 and 15 were directly connected current would flow intermittently through both of the branch circuits. To avoid this unnecessary flow of current the relay 14 is interposed between these wires and comprises two pairs of contacts 30 and 31 controlled by solenoids 32 and 33 respectively so as to be opened when their respective solenoids are energized.

These solenoids, which are of high resistance, are shunted between the wire 13 and the respective branch wires 20 and 26 so that when both branch circuits are connected to the conductor 11, as in the mid position shown in Fig. 1, both of the solenoids 32 and 33 will be energized and both of the contact switches 30 and 31 opened. Consequently no current will flow through the conductor 15 to either of the branch circuits.

Relative motion between the roller contact 12 and the plates 23 and 29 is caused by a displacing element 34 which may be under control of a pressure, temperature, level or other actuated mechanism acting through a suitable connector 35 to move the roller 12 from mid position onto one of the plates 23 or 29 and out of contact with the other. When this occurs the solenoids in only one of these branch circuits will be energized. At the same time one of the relay switch solenoids 32 or 33 will be de-energized, the corresponding contact 30 or 31 closed so that current is now free to pass through the vibrator 15 and intermittently through one or the other of the branch circuits.

For example if the roller 12 moved upwardly onto plate 23 and from plate 29 the solenoid 33 of the relay will be de-energized, the contacts 31 closed and current will pass intermittently through the vibrator 15 to the terminal 16, thence through the conductor 18, solenoid 19, conductor 20, solenoid 21 and conductor 22 to the plate 23 and return through the wire 11. With each vibration of the make and break contact switch 15 the solenoids 19 and 21 will be energized and de-energized.

The energizing and de-energizing of the solenoids 19 and 21 serves to reciprocate corresponding cores or armatures 36 and 37 which in turn act as ratchets on wheels 38 and 39 respectively, serving thereby to move these ratchet wheels with a step by step motion. This motion of the ratchet wheel 39 is transmitted to a shaft 40 journalled in fixed bearings 41 and 42 and having a screw threaded length 43 threaded through a block 44 on which the plates 23 and 29 are mounted.

The ratchet and the screw 43 are so related as to cause the block 44 to move upwardly relative to the roller 12 until mid position is again attained, whereupon the intermittent current will be interrupted; at the same time the ratchet 38 which is fixed on a shaft 45 mounted in bearings 46 and 47 will rotate a screw 48 on which is mounted a nut 49 carrying an indicator 50 and moving adjacent a scale 51.

Inasmuch as the pulsations of current through the solenoids 19 and 21 are identical the cores 36 and 37 will each reciprocate simultaneously or synchronously and the distance through which the indicator 50 moves will be identical with, or in fixed proportion to, the movement of the block 44 required to compensate or equal the movement of the roller 12. In this way the indication of the element 34 will be transmitted instantly and exactly to the indicator 50 where it may be observed or where it may serve to actuate a control apparatus.

If the roller 12 should be drawn downwardly onto the plate 29 and out of contact with the plate 23 the reverse movement would take place. In this case the solenoid 32 would be de-energized, the contacts 30 closed and current would flow intermittently through the vibrator or make and break switch 15 to the terminal 17 and thence through conductor 24, solenoid 25, conductor 26, solenoid 27 and conductor 28 to the plate 29. In this case the solenoids 25 and 27 would be intermittently energized and de-energized and would reciprocate the cores 52 and 53 which serve as ratchets to drive the ratchet wheels 54 and 55 rigidly mounted on the shafts 45 and 40 respectively and arranged to rotate the shafts and the screws 48 and 43 in an opposite direction until the block 44 is lowered sufficiently to bring the roller 12 into mid position relative to the plates 23 and 29.

It will be understood that the relay mechanisms 30—33 merely interrupt the flow of current when both branches are closed through the roller 12 thus avoiding unnecessary waste of current and action on the respective solenoids and cores. The branch circuits might, of course, be interrupted by having the roller out of contact with both plates in mid position but in that case the plates could not be spaced so closely together.

In the above apparatus the plates may be so closely spaced that a very small movement of the roller, as small as 0.0003", will serve to move it out of contact with one or the other of the plates and set the displacing mechanism into action.

By having a roller contact as above described this very fine control is obtained and moreover is independent of the pressure of the roller on the plates, which may be made sufficient to insure adequate electrical contact.

The action of the apparatus may be made very rapid by making the cycles of vibration of the element 15 very rapid as, for example, fifty cycles per second.

Figure 2:
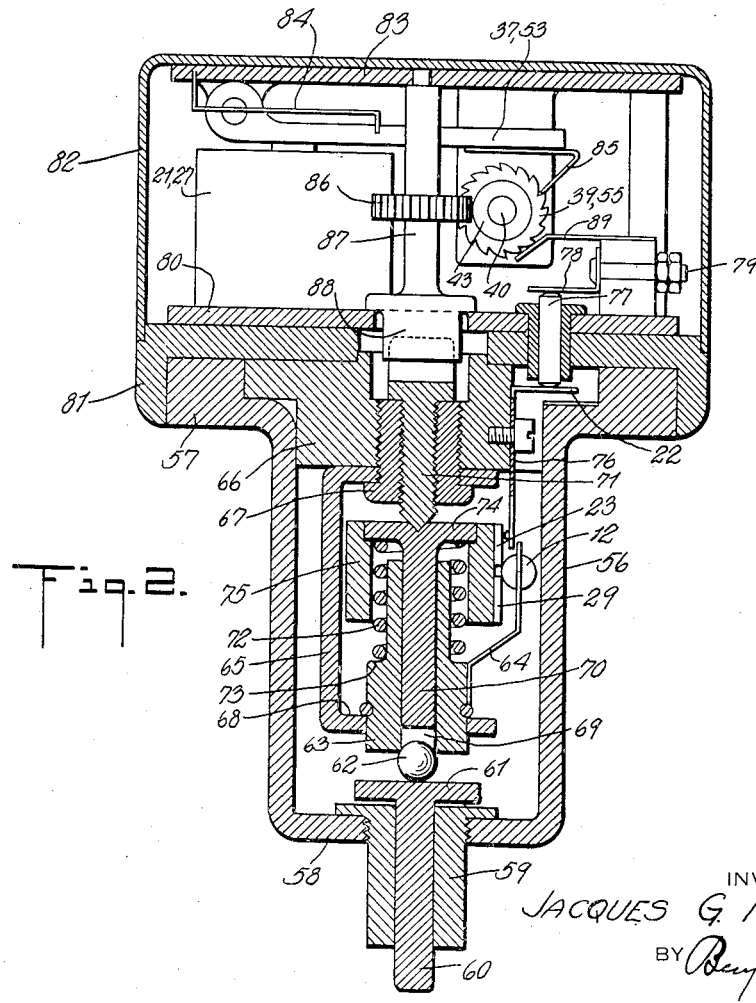
Fig. 2 is a vertical section of a transmitter or sending switch and actuating mechanism.
Figure 5:
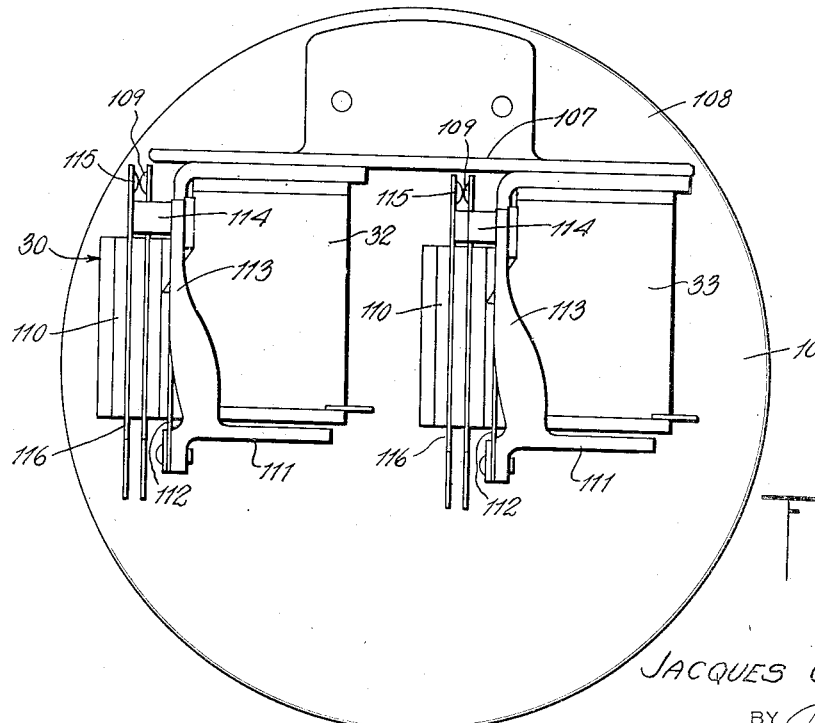
Fig. 5 is a view of a relay mechanism to interrupt the current to the branch circuits when the transmitter is in mid position.

In Fig. 2 is illustrated a preferred embodiment of the transmitting mechanism. This mechanism comprises a housing 56 having a mounting flange 57 at one end, the upper end as shown in Fig. 5, and closed at its lower end 58 about a journal or bushing 59. Movement is transmitted from the actuating element, such as the pressure, temperature or level indicating device, through a stem 60 which extends upwardly through the bushing 59 into the housing 56 and is provided at its upper end with a flat bearing surface 61.

From the bearing surface 61 upward movement is transmitted through a ball 62 to the lower end of a hollow stem 63 resting on the ball 62. The stem 63 is provided with a spring arm 64 on which is mounted the roller 12. The stem 63 is guided in its lower end by a guide plate 65 secured at its upper end to a supporting plate 66 by means of a hollow screw 67 and having a suitable guiding opening in a lower horizontal extension 68.

The stem 63 is provided with a central or axial bore 69 in which is positioned a sliding pin or piston 70 countersunk at its upper end to receive the pointed end of a screw 71 threaded in an insulated bushing.

It will be apparent, therefore, that upward movement of the transmitting pin 60 will serve to lift the hollow stem 63 upwardly relative to the pin or piston 70. When the pin 60 is lowered the stem 63 is forced downwardly by a spring 72 confined between a shoulder 73 on the lower end of the stem 63 and an outwardly extending flange 74 on the upper end of the piston 70.

Secured to the flange 74 and surrounding the spring 72 is an insulating support 75 for the pair of spaced contact plates 23 and 29 respectively. The upper plate 23 is connected by means of a contact connector 76 forming part of the circuit 22 connected by an insulated post 77 and strip 78 to a binding post 79. This binding post is connected to solenoid 21 through connections not shown. Similarly the plate 29 is connected to the other solenoid 27.

These solenoids are mounted on a base plate 80 supported on a top plate 81 on the flange 57. They are preferably enclosed within a casing or housing 82. The reciprocating elements or armatures 37 and 53 are mounted on a plate 83 on the top wall of the casing 82 resiliently retained in upper position by a spring 84. At their opposite ends they carry spring pawls 85 which engage the teeth of the ratchet wheels 39 and 55. These wheels being arranged as indicated in Fig. 1 to be actuated in opposite or reverse directions.

The shaft 40 on which the ratchets 39 and 55 are suitably supported in the casing 82 and the worm 43 acts on a gear 86 which is in turn mounted on a vertical shaft 87. This shaft is slidably coupled to the upper end of the rotatable screw pin 71 by a suitable slot and key connection 88.

It will be apparent, therefore, that when the ratchets 39 and 55 are rotated in one direction or the other the shaft or screw 51 will be rotated through the transmitting mechanism and thereby raise or lower the pin 70 on which the supporting plate 75 and the contact plates 23 and 29 are mounted.

For example, if the transmitting pin 60 is lifted the roller 12 will be lifted relative to the support 75 out of contact with the lower plate 29 and into contact with the upper plate 23. Current will flow through the solenoid 21 and the armature 37 and its ratchet will be actuated in such a direction as to raise the screw 71 and permit the spring 72 to force upwardly the pin 70, the supporting block 75 and the contact plates 23 and 29 until the roller 12 again reaches a relative midway position, whereupon further movement will cease.

Similarly if the transmitting pin 60 drops the bushing 63 and roller will drop and a reverse movement will be set in motion and continue until the block 75 is lowered sufficiently to bring the roller 12 to relative mid position.

The roller 12 may be connected to ground through its supporting spring 64, the hollow stem 63, guide 65 and housing of the mechanism. Only two binding post connections 79 will, therefore, be necessary.

A spring pressed brake 89 bearing against the surface of the ratchet wheels 39 and 55 serves to hold them in position and against any rotation while the spring pawls 85 are withdrawn.

Owing to the alternating movement of the armature and the step by step movement of the ratchet wheels 39 and 55 no part of the mechanism can attain a speed that would cause overriding or hunting. Consequently when the part 48 attains a position corresponding to the moving element 34 it stops without overrun and return.

The make and break or flasher element 15 sends impulses of current alternately in both of the solenoids 21 and 19 or 27 and 25. These impulses must be regularly spaced and the frequency of impulses should not be overly sensitive to variation in voltage.

Figure 3:
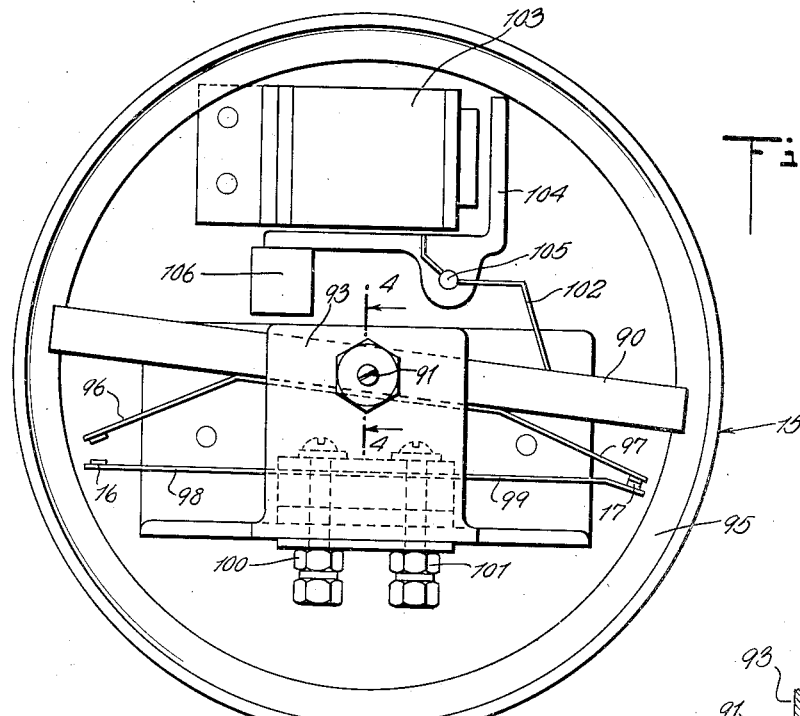
Fig. 3 is a plan view of the intermittent switch or flashing mechanism.
Figure 4:
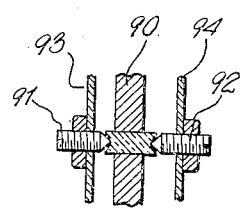
Fig. 4 is a section on line 4—4 of the flashing mechanism of Fig. 3.

In the embodiment of the flasher, as shown in Fig. 3, an insulated rocking arm 90 is mounted between pointed pivot pins 91 and 92, Fig. 4, between supporting plates 93 and 94 in a housing or enclosing case 95. A pair of spring contact arms 96 and 97 are mounted on the rocking arm 90 in position to contact in alternate succession the fixed contacts 16 and 17 of the parallel branch circuits.

The spring contacts 96 and 97 are connected by suitable connectors to the conductor 13 and to the opposite pole of the battery from that connected to the roller 12.

The contacts 16 and 17 are supported on separate insulated spring arms 98 and 99 respectively and to separate insulated binding posts 100 and 101 to which the conductors 18 and 24 are connected.

A spring 102 bearing against the rocking arm 90 serves to press contact 97 against the spring arm 99 and contact 17.

A solenoid 103 in the housing 95 is provided with a rocking armature 104 pivoted at 105 and having a hammer 106 so positioned above the arm 90 that when a momentary current is sent through the solenoid and the armature 104 is attracted the hammer 106 kicks or hits the rocking arm 90 so as to rock it counterclockwise separating the contacts 17 and 97 and closing the contacts 96 and 16. The spring 102 then returns the arm 90 to its original position to be again kicked or hit by a subsequent impulse of current through the solenoid 103.

Inasmuch as the arm 90 is balanced it acts similarly to a pendulum and has a natural period of swing and is, therefore, not sensitive to changes in the intensity of the blow of the hammer 106 and its period of rotation or vibration is thus not substantially affected by changes in the voltage through the solenoid 103. Also being balanced it is not affected by vibrations or changes in position.

The effect of a stronger impulse or blow from the hammer 106 merely causes the arm 90 to swing in a somewhat wider arc but without substantial change in frequency.

The purpose of the relay mechanism 30—33 is to cut off all current in the coils when the roller 12 shorts the copper strips 23—29 and, therefore, when the indicator 50 shows the correct reading.

An embodiment of a suitable relay mechanism for this purpose is illustrated by way of example in Fig. 5 of the drawings. In this embodiment the coils or solenoids 32 and 33 are mounted on a bracket 107 on an insulated plate 108. One contact terminal 109 of the switch 30 is mounted on an insulating block 110 adjacent the solenoid 32. An armature 111 carried on an insulated spring 112 at one side of the solenoid is provided with an arm 113 extending alongside of the solenoid and having a foot 114 bearing against a complementary contact 115 mounted on a spring 116 and normally pressing into contact with the fixed contact 109.

When the solenoid 32 is energized it attracts the armature 111 swinging it and its arm 113 counterclockwise thereby pushing the foot 114 and the spring 116 outwardly and separating the contact 115 from the contact 109. The contacts 109 and 115 are suitably connected to the conductor 13 as indicated in Fig. 1. The solenoid 33 is provided with similar contacts which are, therefore, marked in the drawings with the same reference characters.

An embodiment of the receiving or distant indicator is shown in Figs. 6 and 7. In this embodiment the various elements are mounted in a casing 117 having a base 118. The various elements are mounted between a base plate 119 on the base 118 and a plate 120 secured to the top of the casing. The solenoids 19 and 25 are mounted on the base plate 119 and are suitably connected to the conductors 18, 20, 24 and 26. These connections are not shown in Figs. 6 and 7. The armatures 36 and 52 are mounted on suitable brackets 121 and 122 depending from the upper plate 120 normally held in position by springs 123.

The shaft 45 and the ratchet wheels rigidly mounted thereon are mounted between a pair of brackets 124 and 125 depending from the upper plate 120.

Each of the armatures is provided with a depending spring pawl 126 to engage the ratchet wheels 38 and 54 respectively. It will be understood that these ratchet wheels have their notches engaged reversely and that the spring pawl of the armature 52 acts on its pawl on one side of the shaft 54 and the spring pawl of the armature 36 acts on its ratchet on the opposite side with the result that a downward movement of the armature 52 will rotate the shaft 45 in one direction and a downward movement of the armature 36 will rotate its ratchet in the opposite direction.

A spring brake 127 supported on a block 128 on the plate 119 and bearing against surfaces of the respective ratchet wheels serves to hold them from rotation except under the action of their respective armatures.

The worm 48, rigidly fixed on the shaft 45, meshes with a gear wheel 129 rigidly mounted on a shaft 130 journalled at its upper end in the plate 120 and extending through the lower plate 119 and the base 118 into a recess 131 in the lower surface of the base 118.

A pointer 132 is mounted on the projecting end of the shaft 130 turning with the latter over an indicating or calibrated plate 133 secured to the bottom of the recess 131. The recess may be protected by a glass window 134.

Inasmuch as the armatures 19 and 25 are actuated simultaneously with the armatures 21 and 27 the pointer 132 will swing in exact relation or proportion to the movement of the sending element 34 and will give an exact and immediate indication of the position of the latter.

Fig. 8 illustrates an embodiment of the apparatus for transforming the indications of the armatures 19 and 25 into a pressure indication. In this case the indicating apparatus may be an exact replica of that shown in Fig. 2 except that the contact wheel or roller 12 and the insulated plates 28 and 29 may be omitted.

The indicating apparatus is contained within a depending casing 135 which contains a piston 136 similar to the piston 70 of Fig. 2 and acted upon by a screw similar to screw 71, Fig. 2, and driven by the shaft 130 through a suitable connection.

The piston 136 has an outward flange 137 at its upper end and projects into a hollow stem 138, similar to the stem 70 of Fig. 2, confining a spring 139 similar to the spring 72. Downward movement of the piston 136 is, therefore, transmitted through the spring 139 to the hollow stem 138, its movement is in turn transmitted through a ball 140 to a plate 141 mounted on the lower end of a bellows 142 which at its upper edge is sealed to the casing 135. The lower end of the casing 135 is, therefore, enclosed and sealed by the bellows so that a downward movement of the plate 141 will decrease the effective volume of this part of the casing and compress or put under pressure fluid contained therein which may then be transmitted through an opening 143 leading to any suitable indicating or control apparatus.

It will be understood that this embodiment is given merely as an illustration of a manner in which a pressure or other indication at the sending station may be exactly duplicated at the distance or receiving station.

What I claim is:

1. Electric displacement transmitting apparatus which comprises a source of electric energy; a pair of branch circuits in parallel, each branch circuit comprising a pair of spaced electrically actuated reciprocating elements; a switch comprising a pair of spaced terminals, one for each branch circuit, and a connecting terminal connected to said source of electric energy and in mid position in contact with both terminals, said pair of terminals and said connecting terminal being movable relatively from said mid position to open one or the other of said branch circuits alternatively; a movable element movable in one direction by one of the reciprocating elements of one of said branch circuits to close said connecting terminal to one of said spaced terminals of said switch and in the opposite direction of one of the reciprocating elements of the other branch circuit to close said connecting terminal to the other of said spaced terminals; a second movable element actuated similarly in opposite directions by the other reciprocating elements of said branch circuits; and a switch connecting said branch circuits to said source of electric energy alternately in successive cycles.

2. Electric displacement transmitting apparatus which comprises an electric circuit having a pair of parallel branches each of said branches having a high resistance relay circuit; a switch to open and close said branches in alternate recurring cycles and controlled by said relays; a control switch in neutral position closing both said branches and movable from neutral position in reverse direction to open one of said branch circuits and close the other; a translating mechanism actuated in opposite directions by intermittent impulses in said branch circuits to return said switch to neutral position and a second translating device actuated by the intermittent impulses in said branch circuits to move in proportion to the movement of said first translating mechanism.

3. Electric displacement transmitting apparatus which comprises an electric circuit having a pair of parallel branches; a switch to open and close said branches in alternate recurring cycles; a control switch comprising a terminal unit having a pair of terminals one for each said branch in closely spaced insulated relation and a connector in neutral position closing both said terminals and displaceable in opposite directions from neutral position relatively to said unit to open said branches alternatively; a translating mechanism actuated in opposite directions by intermittent impulses in said branch circuits to return said unit to neutral relative position relative to said connector; and a second translating device actuated by the intermittent impulses in said branch circuits to move in proportion to the movement of said first translating mechanism.

4. Electric displacement transmitting apparatus which comprises an electric circuit having a pair of parallel branches each branch having a high resistance relay circuit; a switch to open and close said branches in alternate recurring cycles; a control switch having a pair of contacts in fixed spacial relation and movable as a unit, one of said contacts being connected to one branch and the other to the other, and a contact in neutral position closing both said contacts and movable relatively to said spaced contacts to open one or the other of said branch circuits; a translating mechanism actuating in opposite directions by intermittent impulses in said branch circuits and acting on said pair of spaced contacts to move them as a unit relative to said connecting contact and a second translating device actuated in opposite direction by intermittent impulses in said branch circuits to move in proportion to the movements of said first translating mechanism.

5. The apparatus of claim 4 in which said terminals comprise a pair of plates in alignment and slightly spaced and in which said connector comprises a roller to roll from one plate to the other.

6. The apparatus of claim 2 in which each said translating mechanism comprises a magnetically actuated ratchet.

7. The apparatus of claim 2 which comprises a magnetically actuated switch to disconnect both branch circuits when said control switch closes both said branch circuits.

8. A control switch which comprises a movable terminal block having a pair of aligned, insulated, spaced, terminal plates; a stem parallel to the alignment of said plates, a contact carrier having a hollow shaft on said stem and movable longitudinally thereof in the direction of alignment of said terminal plates, a roller carried by said carrier and pressing on both said plates in mid position and movable out of contact with each of said plates alternatively as said contact carrier moves in reverse directions lengthwise of said stem; a spring confined between said carrier and said block and an intermittently actuated electromagnetic means to move said block in an axial direction relative to said carrier.

9. The control switch of claim 8 in which said electromagnetic means compries a pair of ratchet wheels actuated in opposite directions and transmission means from said ratchet wheels to said terminal block.

10. The control switch of claim 8 in which said intermittently actuated electromagnetic means comprises a pair of ratchets acting in opposite directions and a transmission from said ratchet to said movable block and comprising a fixed nut and a screw threaded therein and rotatable by said ratchets to bear against said terminal block.

11. Electric displacement apparatus which comprises a control switch having a movable terminal block carrying a pair of aligned, insulated, spaced, terminal plates, a contact carrier movable in the direction of alignment of said terminal plates, a connector carried by said carrier and in contact with both said plates in mid position and movable to move into and out of contact with each of said plates alternatively as said carrier moves in reverse directions; branch circuits, one connected to each said terminal; an intermittently actuated electromagnetic means in each said branch circuit to move said block in reverse directions relative to said carrier and a second pair of electromagnetic means, one in each said circuit to move a translatable element in proportion to the movement of said block.

12. The apparatus of claim 11 comprising an intermittent switch to close said branch circuits alternatively in recurring cycles.

13. A control switch which comprises a hollow shaft; a stem slidable axially in said hollow shaft; an insulating block mounted on said stem; a pair of aligned, insulated, spaced, terminal plates mounted on said block; a spring mounted on said hollow shaft; a roller carried on said spring to press against both said plates and to roll out of contact with one plate or the other upon relative movements in reverse direction of said stem and said shaft and a spring confined between said shaft and said stem to resiliently press said stem in an axial direction relative to said hollow shaft.

14. The control switch of claim 13 including a threaded screw bearing on said stem and a pair of electromagnetically actuated ratchets to rotate said screw.

15. Electric displacement apparatus which comprises a pair of closely spaced insulated terminal plates, a contact roller contacting the adjacent edges of said plates, said roller and plates being relatively movable in reverse directions to open contact alternatively with one terminal plate or the other, a pair of high resistance branch relay circuits connected, one to one terminal plate and the other to the other terminal plate, branch circuits each having a relay switch controlled by one of said relay circuits and open when said relay circuits are closed and closed when its respective relay circuit is open, an intermittent switch to open and close said branch circuits at successive intervals and translating mechanisms in said branch circuits, one of said translating mechanisms of each circuit connected to move said roller and contact plates relatively in a direction opposite to that of the other.

16. The control switch of claim 13, including a pair of electromagnetically actuated ratchets, a pair of branch electric circuits one circuit in series with each said electromagnetically actuated ratchet to rotate said ratchets one in one direction and the other in the opposite direction, means actuated by said ratchets to move said stem alternatively in opposite directions, a source of electric energy connected to said roller and an intermittent switch to connect said branch circuits alternatively in recurring cycles to said source of electric energy.

JACQUES G. MEJEAN.

REFERENCES CITED

The following references are of record in the file of this patent:

UNITED STATES PATENTS

| Number | Name | Date |
|---|---|---|
| 284,382 | Clarke | Sept. 4, 1883 |
| 1,018,765 | Janette | Feb. 27, 1912 |
| 1,158,083 | Stout | Oct. 26, 1915 |
| 1,231,732 | Halbleib | July 3, 1917 |
| 1,262,326 | Grabe | Apr. 9, 1918 |
| 1,696,512 | White | Dec. 25, 1928 |
| 1,767,104 | Volkman et al. | June 24, 1930 |
| 1,784,504 | Tanner | Dec. 9, 1930 |
| 1,853,506 | Carter | Apr. 12, 1932 |
| 1,886,517 | Batcheller | Nov. 8, 1932 |
| 2,342,717 | Yardeny | Feb. 29, 1944 |

FOREIGN PATENTS

| Number | Country | Date |
|---|---|---|
| 319,861 | Great Britain | Oct. 3, 1929 |